(12) United States Patent
D'Acunto et al.

(10) Patent No.: US 11,095,554 B2
(45) Date of Patent: Aug. 17, 2021

(54) APPLICATION FUNCTION IN A NETWORK AND CONTROL THEREOF

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Lucia D'Acunto, Delft (NL); Pieter Nooren, Delft (NL); Toni Dimitrovski, The Hague (NL)

(73) Assignees: KONINKLIJKE KPN N.V., Rotterdam (NL); NEDERLANDSE ORGANISATIE VOOR TOEGEPAST-NATUUR-WETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 16/641,573

(22) PCT Filed: Aug. 27, 2018

(86) PCT No.: PCT/EP2018/072966
§ 371 (c)(1),
(2) Date: Feb. 24, 2020

(87) PCT Pub. No.: WO2019/042912
PCT Pub. Date: Mar. 7, 2019

(65) Prior Publication Data
US 2020/0186462 A1   Jun. 11, 2020

(30) Foreign Application Priority Data
Aug. 28, 2017 (EP) .................... 17188139

(51) Int. Cl.
*H04L 12/725* (2013.01)
*H04L 12/751* (2013.01)
(Continued)

(52) U.S. Cl.
CPC ............ *H04L 45/306* (2013.01); *H04L 45/02* (2013.01); *H04L 45/308* (2013.01); *H04L 45/38* (2013.01); *H04L 45/64* (2013.01); *H04L 67/14* (2013.01)

(58) Field of Classification Search
CPC ..... H04L 45/306; H04L 45/02; H04L 45/308; H04L 45/38; H04L 45/64; H04L 67/14; H04L 45/30; H04L 45/00; G06F 9/5077
See application file for complete search history.

(56) References Cited

U.S. PATENT DOCUMENTS

2012/0028636 A1    2/2012  Khawer et al.
2019/0098545 A1*   3/2019  Zhang .................. H04W 36/22
(Continued)

FOREIGN PATENT DOCUMENTS

| EP | 2 566 199 A1 | 3/2013 |
|----|---|---|
| EP | 3 056 988 A1 | 8/2016 |
| WO | WO 2019/042912 A1 | 3/2019 |

OTHER PUBLICATIONS

International Preliminary Examination Report for PCT/EP2018/072966, entitled: Application Function in a Network and Control Thereof, dated Mar. 12, 2020.

(Continued)

*Primary Examiner* — Afshawn M Towfighi
(74) *Attorney, Agent, or Firm* — Hamilton, Brook, Smith & Reynolds, P.C.

(57) ABSTRACT

In a communication network with separate data planes including a control plane and a user plane, an application function is provided as a combination of an application
(Continued)

function control plane (AF-CP) part operating in the network's control plane and an application function user plane (AF-UP) part operating in the network's user plane. The application function user plane part may be configured for the application-specific processing of user data, and instanced multiple times. The application function control plane part may be configured to support selecting an optimal instance of the application function user plane part for a particular UE.

15 Claims, 13 Drawing Sheets

(51) Int. Cl.
  *H04L 12/721* (2013.01)
  *H04L 12/715* (2013.01)
  *H04L 29/08* (2006.01)

(56) References Cited

U.S. PATENT DOCUMENTS

| | | | | |
|---|---|---|---|---|
| 2019/0174573 A1* | 6/2019 | Velev | ................... | H04W 76/12 |
| 2019/0268828 A1* | 8/2019 | Yin | ....................... | H04W 48/16 |
| 2019/0357129 A1* | 11/2019 | Park | ..................... | H04W 60/00 |

OTHER PUBLICATIONS

International Search Report and Written Opinion for Int'l Application No. PCT/EP2018/072966, titled: Application Function in a Network and Control Thereof, dated Sep. 27, 2018.

Extended European Search Report for EP Application No. EP 17 18 8139, titled: Application Function in a Network and Control Thereof, dated Feb. 16, 2018.

Ericsson: "Security Solution for Infrequent Small Data," 3GPP DRAFT; S3-161408, $3^{rd}$ Generation Partnership Project (3GPP), Mobile Competence Centre; 650, Route Des Lucioles; F-06921 Sophia-Antipolis Cedex, France, vol. SA WG3, No. San Diego, USA, Sep. 27-29, 2016, XP051170366, Retrieved from Internet at: http://www.3gpp.org/ftp/tsg_sa/WG3_Security/TSGS3_84b_San_Diego/Docs/, Retrieved from Internet on: Sep. 20, 2016, whole document.

Ericsson LM, "Use-cases for 5G Media Distribution", Tdoc SA-170569, Jun. 26-30, 2017, 8 pages.

3rd Generation Partnership Project, Technical Specification Group Services and System Aspects, "*System Architecture for the 5G System, Stage 2 (Release 15)*", TS 23.501 V1.0.0 (Jun. 2017), 146 pages.

* cited by examiner

APPLICATION FUNCTION IN A NETWORK AND CONTROL THEREOF

This application is the U.S. National Stage of International Application No. PCT/EP2018/072966, filed on Aug. 27, 2018, which designates the U.S., published in English, and claims priority under 35 U.S.C. § 119 or 365(c) to European Application No. EP 17188139.4, filed on Aug. 28, 2017. The entire teachings of the above applications are incorporated herein by reference.

FIELD OF THE INVENTION

The invention relates to a communication network comprising a plurality of network nodes and configured to provide, as one of the network functions, an application function for supporting an application executed by user equipment. The invention further relates to a network node or a distributed system of network nodes for use in the network. The invention further relates to a method of providing the application function in the communication network, and to a computer program comprising instructions for causing a processor system to perform the method.

BACKGROUND ART

Next generation network architectures, such as 5G, may separate network functions from the underlying hardware resources, being in the case of a telecommunication network the network nodes of the network. For that purpose, so-called Network Virtualization (NV) techniques may be used, and in particular Network Function Virtualization (NFV) techniques which provide network functions that are instantiable in software using the hardware of one or more of the network nodes.

In the following, 'providing' or 'establishing' a network function may thus comprise or refer to the instantiation of the network function in the network.

Such next generation network architectures may further define virtual data planes which separate data traffic in the network. Such virtual data planes, which may be established by Software-Defined Network (SDN) but also by other techniques, may include a control plane to enable transmission of control data in the network, and a user plane to enable transmission of user data to and/or from User Equipment (UE) connected to the network. The user plane may also be referred to as 'data plane'.

Moreover, a set of virtualized network functions may be provided which may be instantiable using one or more of the plurality of network nodes and which comprise user plane functions operating in the user plane and control plane functions operating in the control plane. For example, such control plane functions may include a Session Management Function (SMF) configured to select one or a linked series of user plane functions to be used in a data communication session involving the UE.

Another design target of next generation network architectures is to provide networks which will be 'tailored' to the requirements of the applications which use the network. Such 'tailoring' to a specific type of application, for example a video application running on the UE, may involve the network providing one or more Application Functions (AFs) which provide functions such as streaming of video content, transcoding of the video content, storage of the video content, synchronization of the video content, etc. Effectively, an AF may, when instantiated in the network, configure one or a distributed system of network nodes to function as a streaming server, a transcoder, a network cache, a stream synchronizer, etc. There may be several instantiations of such AF, e.g., to achieve a geographic distribution.

It is noted that although the above refers to virtualization of data planes and network functions, it is also known to establish the data planes and the network functions as described in this specification without virtualization techniques.

3GPP [1] (see references at end of section) describes an architecture for a next generation mobile network which includes AFs. This architecture is shown in FIG. 1, where the AF is shown to be instantiated as a control plane function operating in the Control Plane (CP) of the network. However, the AF in this architecture may be seen as merely representing a function placeholder for different applications and having only broadly defined procedures for how applications can influence the network traffic.

Ericsson [2] proposes to provide the AF in a Content Delivery Network (CDN), with the AF being connected to the UPF via the N6 interface. The AF is thereby similar to a traditional proxy cache except now being located at the mobile edge. Accordingly, the decision of whether the UE will use a certain AF instance may be made by the 'request routing' functionality of the CDN which is typically located far from the UE's Access Network (AN). This may have a number of disadvantages:

Request routing may introduce latency. For example, the first request of the UE may be sent outside the access and core network, resulting in a higher latency than a request which is directly sent to an edge cache. In fact, it may require the UE to send one extra message to receive the requested data since the UE may first send the request to the central CDN 'request routing functionality' which may reply with the AF's address that is to be used in the subsequent request message Selection of AF instances may not be optimal. Although the CDN can also obtain information about the UE's mobility via the connection of the AFs to the Network Exposure Function (NEF), the level of exposure which is provided by the NEF to the information on the AF and other network functions is less than what the network functions offer themselves: the NEF may lack knowledge which may result in the CDN making a sub-optimal selection. For example, an AF may be selected which seems closer to the UE, but which in reality is not due to how the user data is routed.

More complexity in the CDN 'request routing' functionality. In an attempt to obtain optimal AF selection, the CDN may have to take aspects into account which may be essentially internal to the network, such as mobility events, degradation events, etc. This may not only make the CDN's routing more complex, but also this type of information may mismatch the CDN operating (mostly) at the application layer.

REFERENCES

[1] 3rd Generation Partnership Project, Technical Specification Group Services and System Aspects, "*System Architecture for the 5G System, Stage 2 (Release 15)*", TS 23.501 V1.0.0 (2017-06)

[2] Ericsson L M, "*Use-cases for 5G Media Distribution*", Tdoc SA-170569, Jun. 26-30, 2017.

SUMMARY OF THE INVENTION

It would be desirable provide an application function in a communication network which addresses one or more of the disadvantages of [1] or [2].

The following aspects of the invention involve providing an application function which may be provided as a combination of an application function control plane part operating in the control plane and an application function user plane part operating in the user plane. The application function user plane part may be configured for the application-specific processing of user data associated with the application, and instanced multiple times. This partitioning of the application function may address one or more of the disadvantages of [1] or [2], since the control part may be provided in the control plane of the network, and thereby in the core of the network, and configured to support selecting an 'optimal' instance of the user plane part for a particular UE.

In accordance with a first aspect of the invention, a communication network may be provided which may comprise a plurality of network nodes.

The network may be configured to provide:
a control plane to enable transmission of control data in the network;
a user plane to enable transmission of user data to and/or from user equipment which is connected to the network; and
a set of network functions which may comprise user plane functions operating in the user plane and control plane functions operating in the control plane.

The control plane functions may include a session management function configured to select, and optionally configure one or a linked series of user plane functions to be used in a data communication session involving the user equipment.

The network may be configured to provide, as one of the network functions, an application function which supports an application executed by the user equipment, the application function being provided as a combination of an application function control plane part operating in the control plane and an application function user plane part operating in the user plane and configured for application-specific processing of user data associated with the application.

The application function user plane part may be selected from a plurality of application function user plane parts, each of the plurality of application function user plane parts being accessible via one or more user plane functions.

The application function control plane part may be configured with identification information identifying the plurality of application function user plane parts and to communicate with the session management function to enable said function to select the one or the linked series of user plane functions so as to establish a network path from the user equipment to said selected application function user plane part.

In accordance with a further aspect of the invention, a network node or a distributed system of network nodes may be configured as the application function control plane part in the communication network and may comprise:
a data storage comprising the identification information identifying the plurality of application function user plane parts;
a network interface to the network;
a processor system configured to communicate via the network interface with the session management function to enable said function to select the one or the linked series of user plane functions so as to establish the network path from the user equipment to said selected application function user plane part.

In accordance with a further aspect of the invention, a network node or a distributed system of network nodes may be configured as the application function user plane part in the communication network and may comprise:
a network interface to the network and configured to receive or send the user data associated with the application executed by the user equipment;
a processor system configured to perform the application-specific processing of the user data.

In accordance with a further aspect of the invention, a network node or a distributed system of network nodes may be configured as the session management function in the communication network and may comprise:
a network interface to the network and configured to receive data from the application function control plane part which is indicative of the selected application function user plane part, or indicative of the network path which is to be established;
a processor system configured to, via the network interface, select the one or the linked series of user plane functions to be used in the data communication session involving the user equipment, wherein said selection is based on the data received from the application function control plane part.

In accordance with a further aspect of the invention, a method may be provided for providing an application function in a communication network. The network may comprise a plurality of network nodes and be configured to provide:
a control plane to enable transmission of control data in the network;
a user plane to enable transmission of user data to and/or from user equipment which is connected to the network; and
a set of network functions which comprise user plane functions operating in the user plane and control plane functions operating in the control plane.

The control plane functions may include a session management function configured to select, and optionally configure one or a linked series of user plane functions to be used in a data communication session involving the user equipment.

The method may comprise providing, as one of the network functions, an application function which supports an application executed by the user equipment, the application function being provided as a combination of an application function control plane part operating in the control plane and an application function user plane part operating in the user plane and configured for application-specific processing of user data associated with the application, wherein the application function user plane part is a selected one of a plurality of application function user plane parts being accessible via one or more user plane functions.

Providing the application function may comprise:
configuring the application function control plane part with identification information identifying the plurality of application function user plane parts;
selecting the application function user plane part from the plurality of application function user plane parts; and
establishing communication between the application function control plane part and the session management function to enable said function to select the one or the linked series of user plane functions so as to establish a network path from the user equipment to said selected application function user plane part.

The above measures may be based on the following considerations. It may be desirable to enable an application running on an UE to use an 'optimal' AF instance amongst the AF instances in a network. Here, 'optimal' may refer a global optimum but also a local optimum, e.g., being better than another AF selection. Such 'optimality' may be quantifiable by one or a combination of network metrics, or in terms of meeting requirements such as application requirements, etc. Various other quantifications of 'optimality' are equally conceived. It may also be desirable to provide the application function in a manner which is transparent to the application, e.g., to avoid CDN vendors and/or service providers having to deal with low-level, network-layer details.

The application function as provided by the above measures may represent a partitioning in two parts: a part that performs the actual application-specific processing of the user data, which may be referred to as Application Function-User Plane (AF-UP), and a part that controls the usage of the application function, which may be referred to as Application Function-Control Plane (AF-CP). The AF-CP may be provided in the control plane of the network, and thereby in the core of the communication network, rather than outside of the core network, e.g., in a data network such as the CDN. There may be several AF-UP instances, for example representing different edge caches, with each of these AF-UP instances being connected to the core network via one or more UPFs. The UPFs may transmit and process user data in a non-application specific manner, and may be selected and optionally configured by the SMF when establishing a data communication session involving the UE. The AF-CP may be aware of these AF-UPs, e.g., in terms of their network address, location, application-specific capabilities, etc., e.g., by way of identification information stored by the AF-CP. With this identification information, the AF-CP may support the SMF in selecting one or more UPFs which represent an optimal network path to a desired AF-UP, e.g., by sending data to the SMF indicative of the AF-UP or the network path which is to be established to the AF-UP. This desired AF-UP may be directly selected by the AF-CP. Alternatively, the SMF may select one or more UPFs which lead to, and thereby essentially select, a particular AF-UP.

For example, in some embodiments, the AF-UP may be selected to be located close(st) to the UE, in order to save network bandwidth and decrease latency. This may enable new network services, e.g., where ultra-low latency may be required, such as Virtual Reality (VR) or Augmented Reality (AR), and may improve the performance of existing services, e.g., video streaming in a highly mobile environment.

In line with 3GPP [1], it is envisioned that the AF-CP may be 'internal' or 'external' to the core of the network. In the first case, the AF-CP may be directly connected to a service bus of the control plane. In the latter case, the AF-CP may be connected to the NEF and interact with other control functions via the NEF.

In an embodiment, the application function control plane part may be configured to select the application function user plane part, and provide data indicative of the selected application function user plane part, or indicative of the network path which is to be established, to the session management function to enable said function to select the one or the linked series of user plane functions to the selected application function user plane part. The AF-CP may thus select the AF-UP and may 'steer' the SMF to establish a suitable network path to the AF-UP by providing data to the SMF which is indicative of the selected AF-UP, e.g., of its exact or approximate location, or data which is indicative of the network path to be established to the selected AF-UP.

For example, the data provided to the session management function may comprise network-level information, including but not limited to one or more of:
an identifier indicative of the application function user plane part, e.g., a type allocation code identifier;
a location of the application function user plane part, e.g., as indicated by a cell identifier;
an identifier of the user equipment;
an identifier or a serving area of one or more of the selected one or linked series of user plane functions; and
a data network name of a data network which comprises the application function user plane part.

In another example, the data provided to the session management function may comprise application-level information, including but not limited to one or more of:
an identifier of the application; and
an identifier of the application-specific processing to be performed by the selected application function user plane part.

In an embodiment, the application function control plane part may be configured to identify a subset of the plurality of application function user plane parts, and provide data indicative of the subset of application function user plane parts, or data indicative of the network path which is to be established to one or more of the subset, to the session management function. The session management function may be configured to select the one or the linked series of user plane functions based on said data. Instead of directly selecting one particular AF-UP, the AF-CP may rather influence the SMF to select from a subset of AF-Ups. For example, the AF-CP may identify a subset of suitable AF-UPs, e.g., which all meet certain application requirements, and identify these AF-UPs to the SMF, e.g., in the form of the network-level or application-level information as previously described. An advantage of this embodiment is that the SMF may also take other considerations into account, such as network conditions, load, topology, etc., which may represent a more 'holistic' approach to the selection of the AF-UP than the direct selection of the AF-UP by the AF-CP.

In an embodiment, the session management function may be configured to, when selecting a linked series of user plane functions, select an access user plane function which is connected to an access network, via which the user equipment is connected to the network, on the basis of the access user plane function having at least one of: a serving area which includes the user equipment, and a location nearest to the user equipment according to a distance metric. The SMF may thus select the series of UPFs to have an access UPF nearby the access network of the UE. This may provide a lower latency and/or higher bandwidth between the UE and the AF-UP.

In an embodiment, the control plane functions of the network may further include a policy function which performs policy control for quality of service in the network, and the session management function may be configured to select the one or the linked series of user plane functions further based on policy data provided by the policy function. In an embodiment, the application function user plane part may be selected further based on the policy data. By taking the policy data in account, the UPFs and/or the AF-UP may be selected to achieve better quality of service.

In an embodiment, the control plane functions of the network may further include an access management function for authenticating and authorizing user equipment so as to enable the user equipment to register with the network, and the application function control plane part may be configured to subscribe to the access management function with a list of identifiers of user equipment so as to be notified when the user equipment identified on the list registers with the network. This may allow the AF-CP to initiate the selection of an AF-UP and associated UPF(s) when a UE, which may be known to run an application, registers with the network.

In an embodiment, the access management function may be further configured to manage mobility of the user equipment and signal the application function control plane part when the user equipment changes location.

In a specific embodiment which further illustrates the advantages of several of the above measures, a UE may request a Protocol Data Unit (PDU) session with a 3GPP/5G network for a specific application. The SMF may use locality information from an Access and Mobility Management Function (AMF), policy data from a Policy Function (PCF) and application-level and/or network-level information from the AF-CP, to select the optimal UPF(s) and build a PDU session for the UE to a selected AF-UP.

In a more specific embodiment, the AF-UP may be selected at the time of establishment of the UE's PDU session. Accordingly, it may be avoided that time is unnecessarily spent to establish a first PDU session to a CDN request routing function outside the 3GPP/5G network, and then establish a second PDU session to a local AF. The SMF may also know the topology and traffic conditions of the network, which may further contribute to the optimality of the selected UPF(s). In a more specific embodiment, the SMF may dynamically reroute the PDU session to another UPF during a PDU session, e.g., if network conditions, load, topology or application requirements change. This may allow for a more granular control of the AF resources.

In an embodiment, the communication network be a telecommunication network. In an embodiment, the communication network may comprise a core network, e.g., of a mobile network. In an embodiment, the communication network may be a network adhering to one or more 3GPP standards.

In an embodiment, the application function may be a media function, and the application-specific processing performed by the application function user plane part may be a processing of media content, including but not limited to one or more of:
 a streaming of the media content;
 a transcoding of the media content;
 a storage of the media content; and
 a synchronization of the media content.

It will be appreciated by those skilled in the art that two or more of the above-mentioned embodiments, implementations, and/or aspects of the invention may be combined in any way deemed useful.

Modifications and variations of any one of the network nodes, the method and/or the computer programs, which correspond to the described modifications and variations of the communication network, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
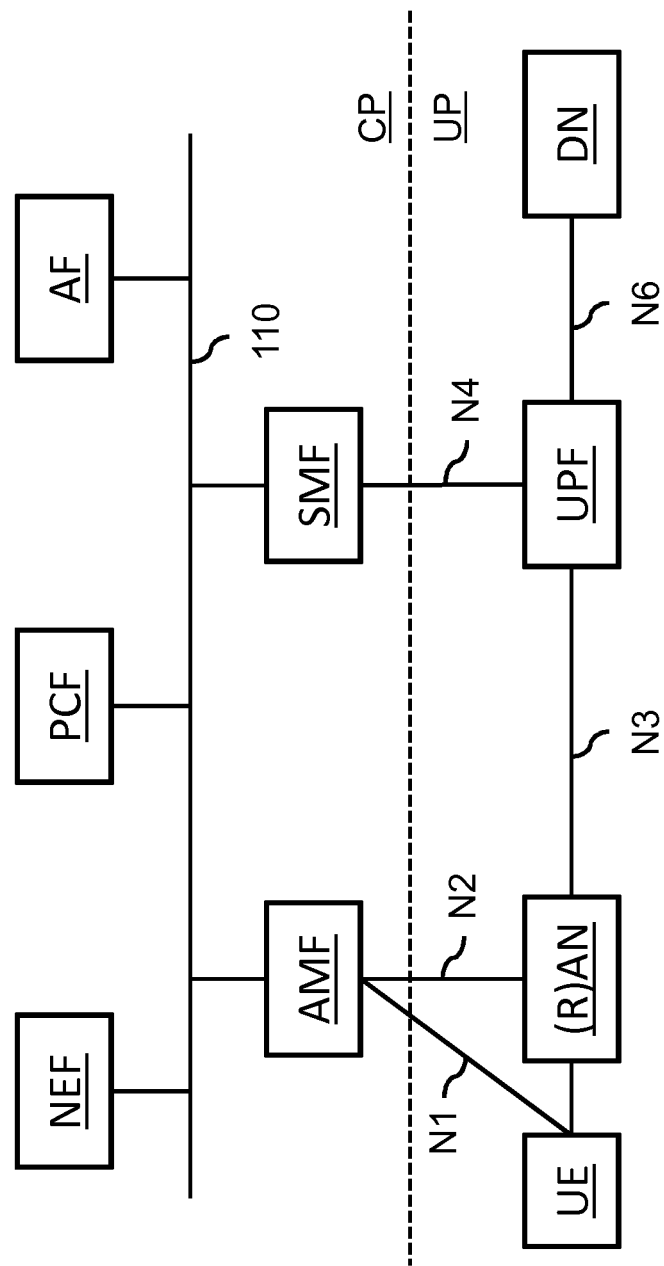
FIG. 1 shows a prior art telecommunication network in which an AF is provided as a control plane function operating in the control plane of the network.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.
 N1-N6 interfaces
 AF application function
 AF-CP application function control plane part
 AF-UP application function user plane part
 AMF access management function
 CDN content delivery network
 CP control plane
 DN data network
 DNN data network name
 NEF network exposure function
 PCF policy function
 PDU protocol data unit
 (R)AN (radio) access network
 SMF session management function
 SUPI subscriber permanent identifier
 UE user equipment
 UP user plane
 UPF user plane function
 0', 0" notification request (SUPI list, mobility events)
 0'" notification request (SUPI list)
 1 registration
 2, 2' notification (UE registered, location)

3 PDU session establishment request (DNN of CDN, slice)
4 selection of SMF in slice
5 PDU session establishment request (DNN of CDN)
6 notification request (location change)
7, 7', 7" PDU session establishment messages
8, 9 PDU session establishment response
10, 10', 10" notification request (IP address change)
11, 11', 11" notification (IP address of UE)
12 traffic flow
13 notification (UE location change)
14 change access UPF
15, 15', 15" request for AF-UP information
100 network configured to provide application function
110 service bus
200 network node configured as AF-CP
210 network interface
220 processor
230 storage
300 network node configured as AF-UP
310 network interface
320 processor
400 method of providing application function
410 providing application function as combination of parts
420 configuring application function control plane part
430 selecting application function user plane part
440 selecting user plane functions
500 computer readable medium
510 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described in the context of a telecommunication network adhering to one or more 5G 3GPP standards, such as [1] which is hereby incorporated by reference. In these embodiments, the network functions as claimed may be further explained in accordance with the following glossary. This glossary, however, is not meant to limit the interpretation of the claims. Namely, the concepts described in the following embodiments may equally apply, mutatis mutandis, to any other type of communication network having separate user and control planes and network function capable of performing the functions as defined by the wording of the claims.

For example, the 'split' AF-CP/AF-UP may be used in a communication network in the domain of Intelligent Transport Systems, mobility, self-driving cars, etc. Examples of AF-UP functions for mobility may include, but not limited to:

A Road Safety server, providing, e.g., applications for emergency vehicle warnings, intersection collision warnings and wrong-way driving warnings;
A Traffic Efficiency server, providing, e.g., applications for speed limit notifications and route guidance; and
A server providing further support for applications, e.g., by providing a Local Dynamic Map.

Glossary of Terms

AMF—Access and Mobility Management Function: may provide UE-based authentication, authorization, and mobility management. The AMF may be the first element that a UE connects to when it wishes to use a 5G network.

DN—Data Network: may represent a network outside of the 5G network. This may still be inside the operator's network, or may be outside, facing the Internet.

NEF—Network Exposure Function: may expose the network functions and capabilities of the 5G network to 3rd parties, e.g., not affiliated with the operator.

PCF—Policy Function: may be responsible for policy control in order to enable Quality of Service (QoS) management.

PDU—Protocol Data Unit: this term may refer to a packet or frame exchanged between a UE and an entity in the Data Network.

PDU Session: an association between the UE and a Data Network (DN) that provides a PDU connectivity service. The type of association may be IP, Ethernet or unstructured. Via a PDU session the UE may exchange data with the particular DN.

(R)AN—(Radio) Access Network: part of the network that connects the UE with the core 5G network (e.g., AMF, PCF, NEF, SMF, UPF may be in the core).

SMF—Session Management Function: may be responsible for session management and may allocate IP addresses to UEs; may also select and control the UPFs for data transfer; the SMF may be seen as an SDN network controller.

UE—User Equipment: may represent an end-user device (e.g. mobile phone, tablet, smart watch, VR headset, TV, set-top box, laptop, etc.).

UPF—User Plane Function: may route the PDU sessions of UEs across the 5G network; it may be seen as a network router or switch or forwarder.

Prior Art Network

FIG. 1 shows a prior art telecommunication network as described by [1] in which an AF is provided as a control plane function operating in the control plane CP of the network. It can be seen that the AF is connected to a service bus 110 in the control plane CP. FIG. 1 further illustrates the user plane UP, and interfaces N1, N2 and N4 which may be used by the control plane to setup data-paths in the user plane.

Network with Partitioned AF

Figure 2:
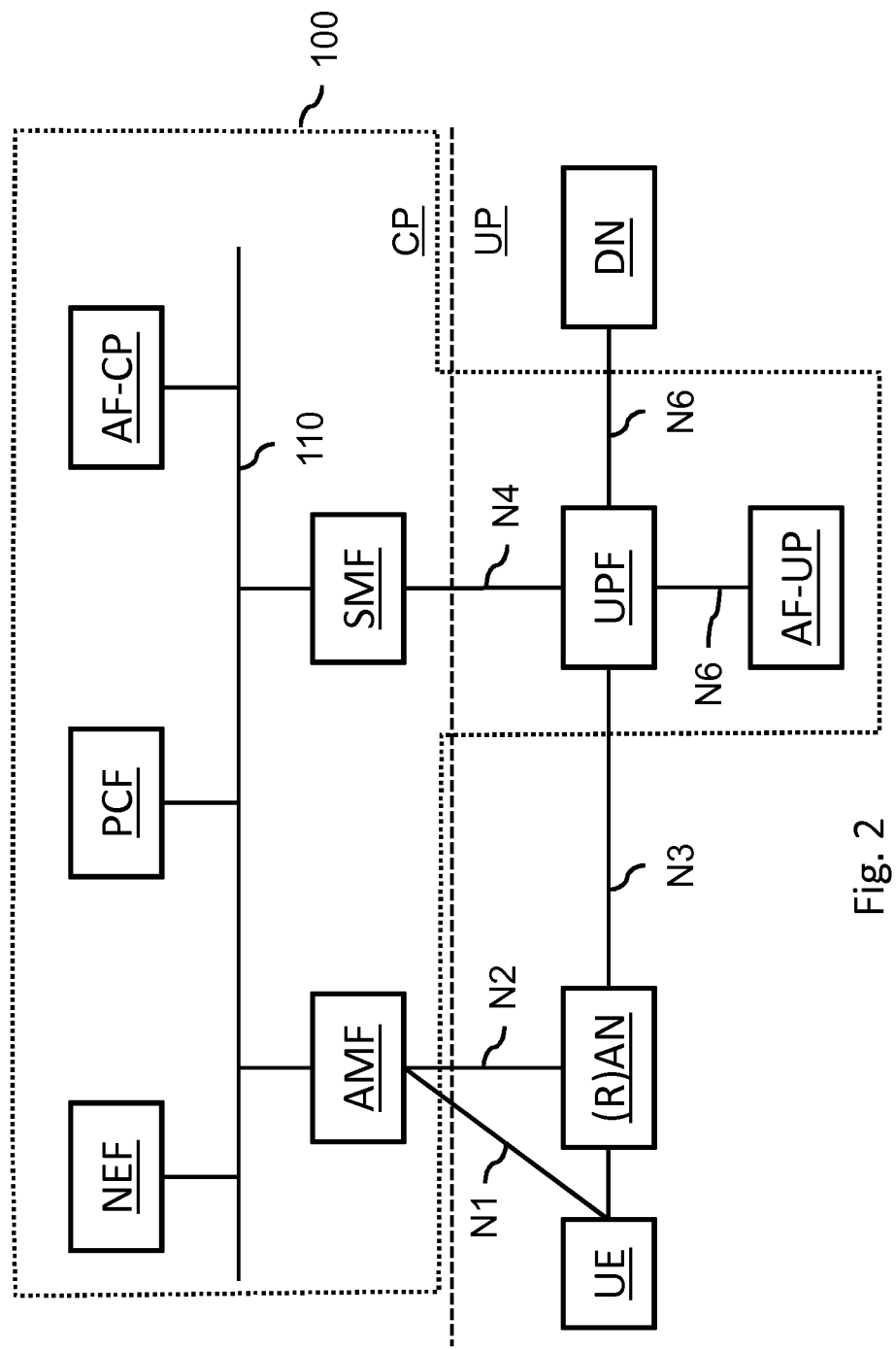
FIG. 2 shows a telecommunication network in which an AF is provided as a combination of a control plane part (AF-CP) and a user plane part (AF-UP)
Figure 3:
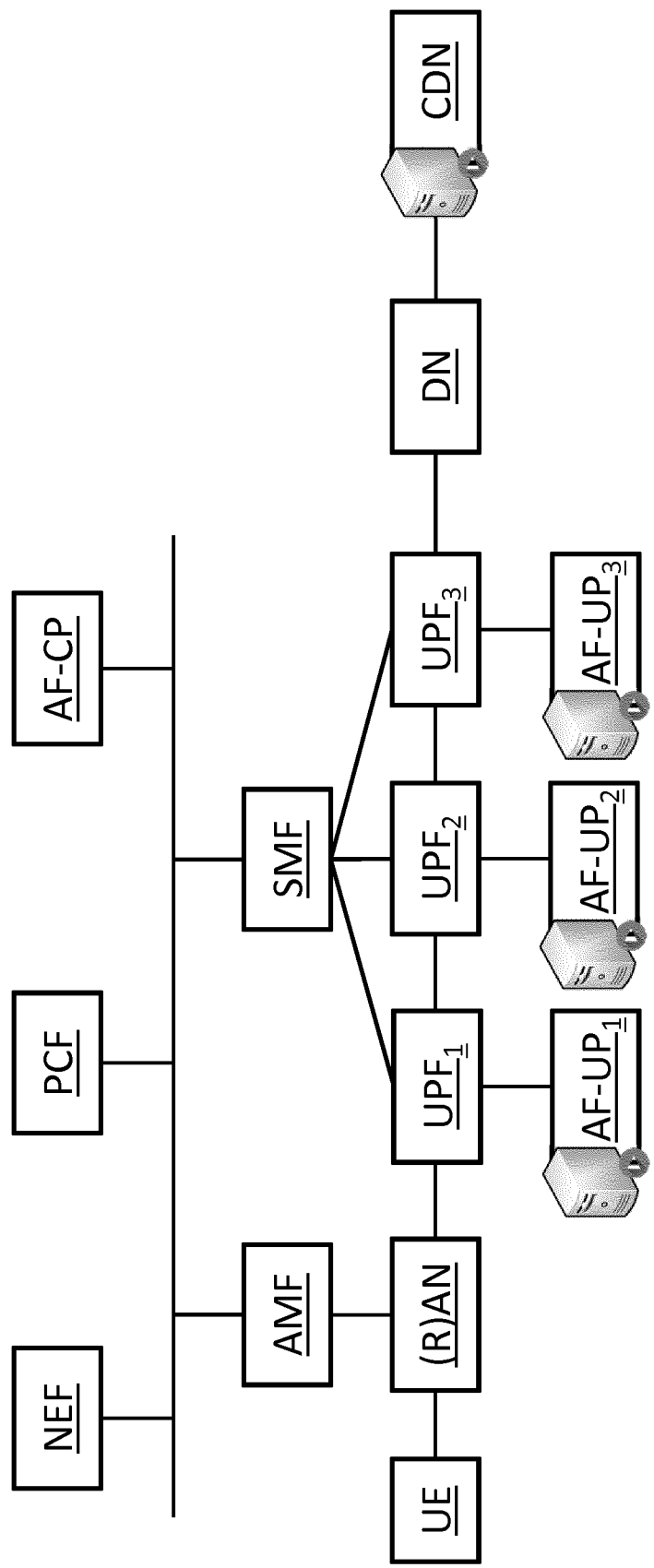
FIG. 3 shows the telecommunication network of FIG. 2 with multiple AF-UP instances, each being connected to a respective user plane function (UPF)

FIG. 2 shows a telecommunication network 100 in which an AF is provided as a combination of a control plane part AF-CP, which is connected to the service bus 110, and a user plane part AF-UP which is connected to an UPF via a N6 interface. FIG. 3 is similar to FIG. 2, except that it shows multiple instances of AF-UPs, e.g., AF-UP$_1$, AF-UP$_2$ and AF-UP$_3$, which are each connected to respective UPFs, e.g., UPF$_1$, UPF$_2$ and UPF$_3$. Also shown is a Content Delivery Network connected to the DN. An example of the telecommunication network 100 is a mobile operator network which may contain 3GPP core functions, but also a mail server, transcoder, etc.

FIGS. 2 and 3 thus illustrate a 'split' AF, i.e., split into AF-CP and AF-UP, within the context of a 3GPP/5G network. Compared to the prior art 5G network of FIG. 1, the AF-CP replaces the AF in the control plane, whereas the AF-UP is newly added. The AF-UP may be located outside the 3GPP/5G network. A reason for this is that the 3GPP/5G network may be kept application-agnostic as per 5G philosophy, especially in the user plane with the UPFs in the bottom part of the figure. The split between AF-CP and AF-UP adheres to this philosophy. Nevertheless, the AF-UP may be inside the mobile operator's network, as it may provide the practical means for the operator to improve the delivery of media applications, e.g., with adaptively distributed local functions in its network, and may thus be located in the 'mobile edge'. Also shown is the external CDN which cannot have the same deep integration in the 5G network.

In the next sections, we describe the information exchange between the network functions during or for setup of an AF, during establishment of a PDU session, the data transfer path during the PDU session, and other aspects such as UE mobility. Here, reference signs are provided to the messages represented by arrows in the respective figures, e.g., with (1) referring to an arrow labeled '1'.

AF Setup

Figure 4:
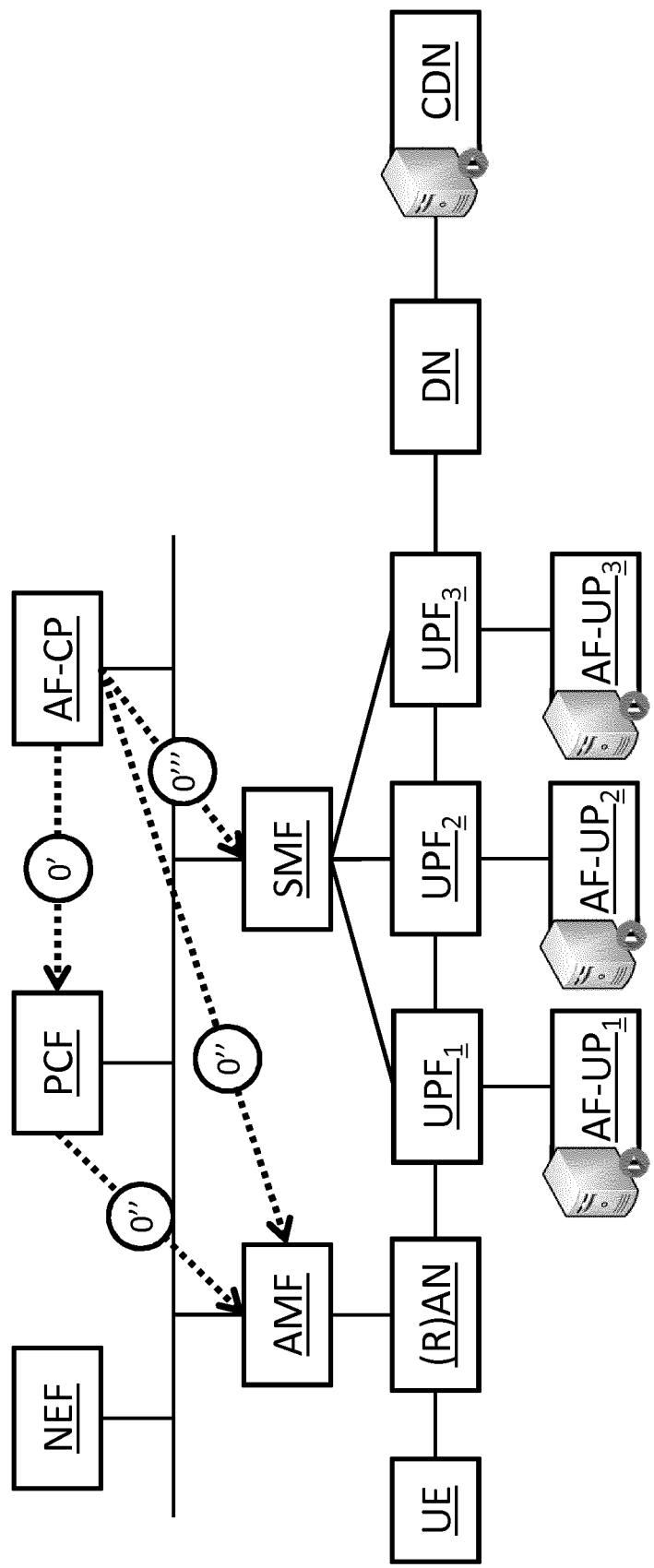
FIG. 4 illustrates message exchange during setup of the AF, with the AF-CP registering with several network functions for events that involve selected UEs.

FIG. 4 illustrates message exchange during setup of the AF, with the AF-CP registering with several network functions for events that involve selected UEs. Such setup may, in a first step, comprise the AF-CP being set up so that it is informed when a UE registers or has a status change that requires an action of the AF-CP/AF-UP combination. For each UE that can use the application (for example, because a user has a subscription to a media service), the AF-CP may know a unique identifier, for example the SUPI (Subscriber Permanent Identifier) or IMSI (International Mobile Subscriber Identity). It may receive these identifiers from the CDN or application provider in a process not shown here. The AF-CP may subscribe to notifications related to the involved UEs by communicating the list of SUPIs and the events that it is interested in to the relevant functions, including but not limited to:

PCFs (0'), for events related to policy control for QoS.
SMFs (0'''), for events related to the session management, including selection of UPFs, and allocation of IP addresses to UEs.
AMF (0''), for events related to UE-based authentication and mobility.

The subscription of the AF-CP may be sent directly to the network function, but also indirectly: for example, the subscription to the AMF may be sent through the PCF as the 5G service-based architecture with its service bus allows for this. Another indirect route that may be relevant is through the NEF. This route may be appropriate when the AF-CP is, to some degree, outside of the mobile operator domain.

In the case that multiple network slices are used, the AF-CP may subscribe to all PCFs and SMFs in the slice that it is in, and to all AMFs that serve the slice.

After the AF setup, the AF-CP may be informed of events in the 5G network that relate to the UEs and the applications for which it needs to steer the use of AF-UPs, e.g., on the basis of the AF-CP communicating with the SMFs.

UE Registration

Figure 5:
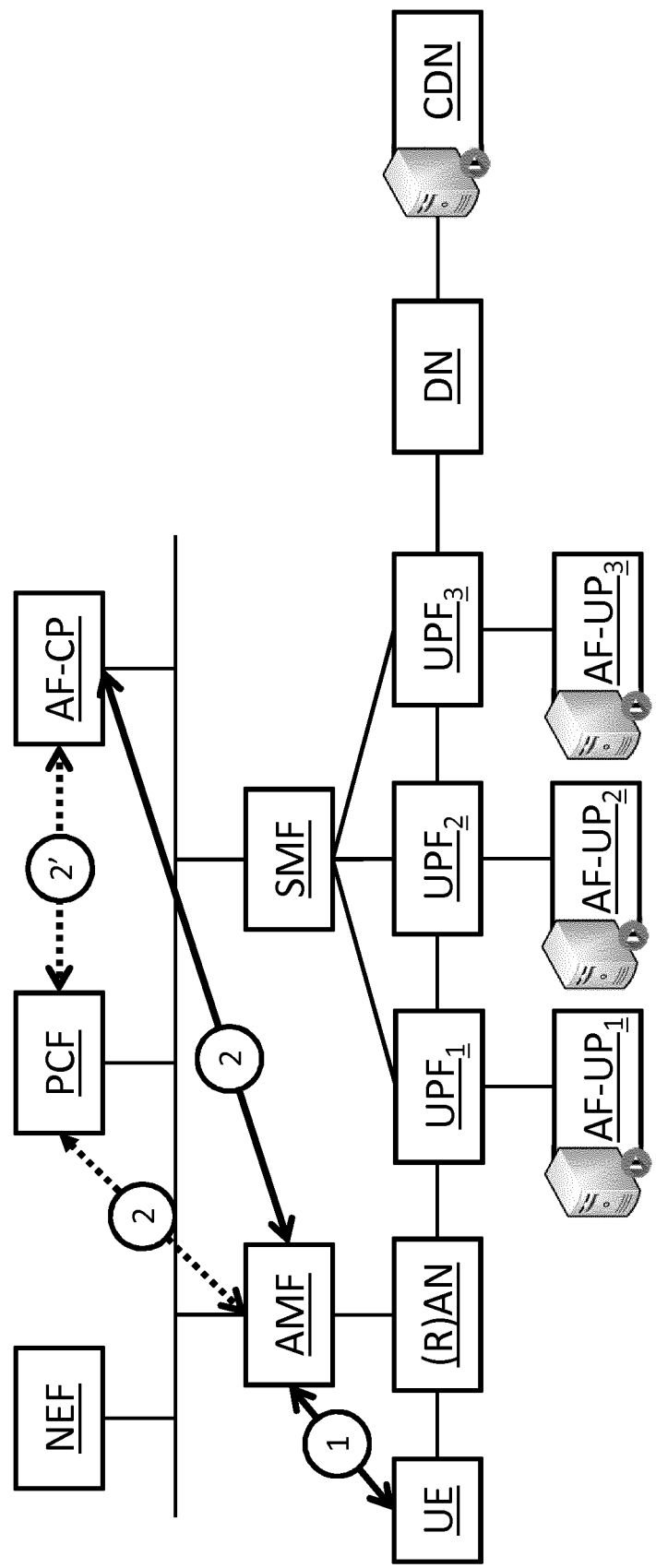
FIG. 5 illustrates a further message exchange during the setup of the AF, with the AF-CP being informed of location information related to the UE.

FIG. 5 illustrates a further message exchange during setup of the AF, with the AF-CP being informed of location information related to the UE. Namely, as a next step, when a UE registers with the AMF and is authenticated (1) thereby, the AF-CP may be notified. The notification may take different routes: directly from the AMF to the AF-CP, see (2) solid line, through the PCF, see (2), (2') dotted lines, or through the NEF (not shown in the picture).

PDU Session Establishment

Figure 6:
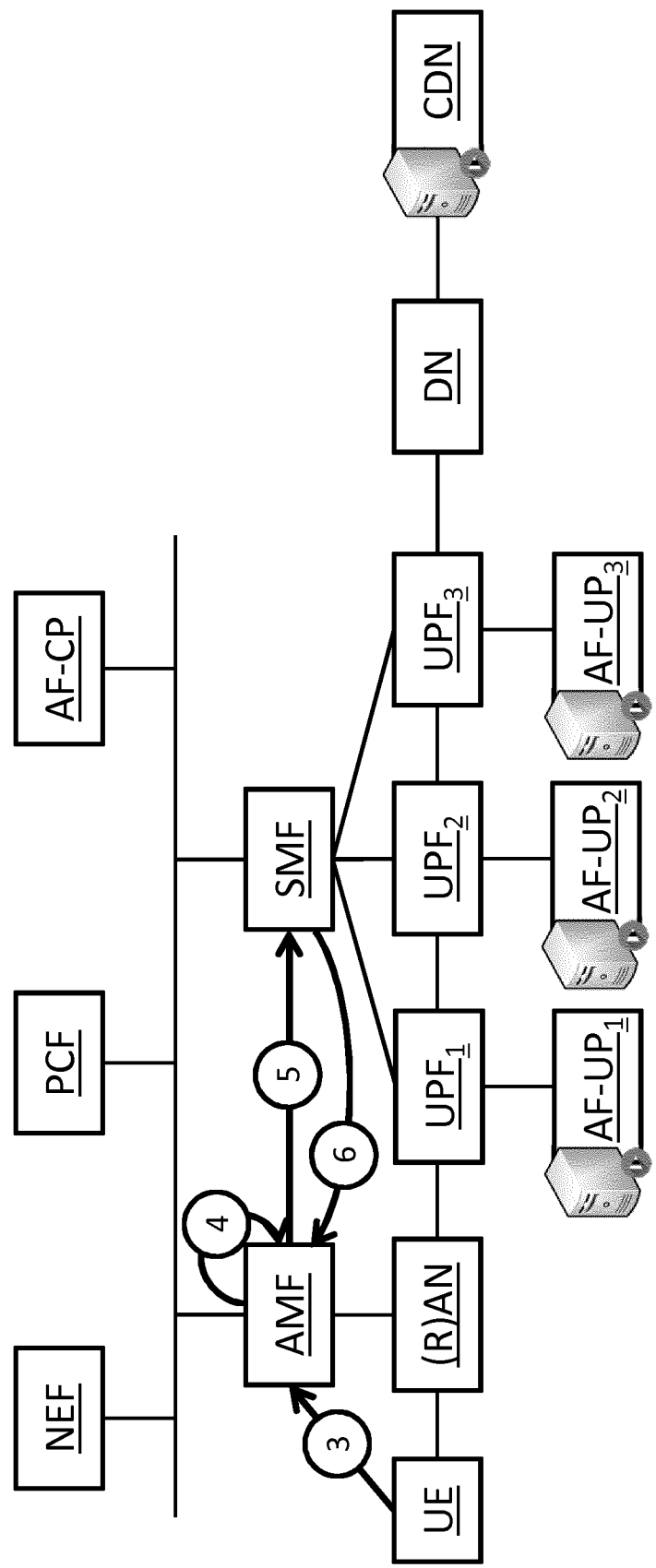
FIG. 6 illustrates a message exchange in the establishment of a PDU session, showing messages from initial UE request to SMF notification.

FIG. 6 illustrates a message exchange in the establishment of a PDU session, comprising messages from initial UE request to SMF notification. Once the UE has received the necessary information during registration, it may be ready to initiate a PDU session with the network for the particular service the UE intends to use. Hence, the UE may issue a PDU Session establishment request (3) to the AMF, while providing information received during registration, such as the DNN of the CDN and the slice ID. The AMF may select (4) one of the SMFs in the slice that the UE is deemed to use, and may then forward (5) the PDU session establishment request to the selected SMF (5). The SMF may subscribe (6) to the AMF for a change of the location of this UE, in case such location change would require changing traffic paths for this UE. This may correspond to standard procedure in a 3GPP/5G telecommunication network.

Figure 7:
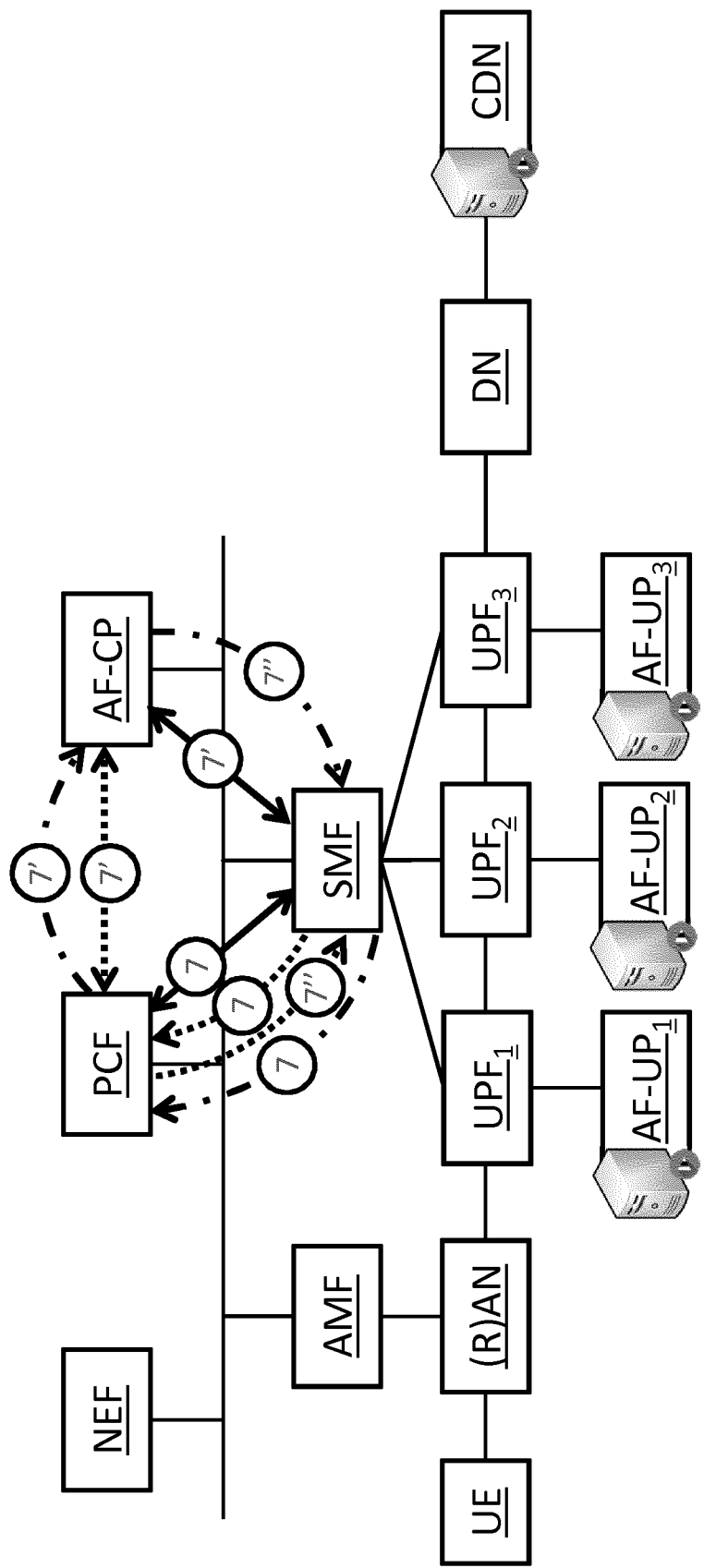
FIG. 7 illustrates a further message exchange in the establishment of the PDU session, involving the selection of UPFs by the SMF.

FIG. 7 illustrates a further a message exchange in the establishment of the PDU session, but now involving the selection of UPFs by the SMF. Namely, at this point, the SMF may select the chain of UPFs for this UE. To do so, the SMF may obtain information from the AF-CP, e.g., associated with the AF-UP to route the PDU session to, and optionally from the PCF, e.g., regarding QoS requirements of this UE. To obtain this information, there are several messaging possibilities, including:

1. The SMF may ask the PCF and the AF-CP for this information individually, see (7) and (7') solid lines.
2. The SMF may ask the PCF for both policy and AF-UP information; the PCF in turn may ask AF-CP for AF-UP information and, once obtained, send both types of information back to the SMF, see (7) and (7') dotted lines.
3. The SMF may ask the PCF for both policy and AF-UP information; the PCF in turn may send the policy information to the AF-CP along with the request for AF-UP information; the AF-UP may contact the SMF and provide both policy and AF-UP information, see (7), (7') and (7") dot-dashed lines.
4. The SMF may ask the AF-CP for both policy and AF-UP information; the AF-CP in turn may ask the PCF for policy information and, once obtained, send both types of information back to the SMF (not shown in FIG. 7)
5. The SMF may ask the AF-CP for both policy and AF-UP information; the AF-CP in turn may send the AF-UP information to the PCF along with the request for policy information; the PCF may contact the SPF and provide both policy and AF-UP information (not shown in FIG. 7)

Alternatively, in otherwise the same manner as the above 5, only the messages to and from the AF-CP may be routed via the NEF (not shown in FIG. 7)

Regarding the type of information that the SMF will receive from the AF-CP for AF-UP selection, there are the several possibilities, including but not limited to:

1. The AF-CP may select which of the AF-UP instances is to be used, and pass information which directly or indirectly represents this selection to the SMF
   a. This information may be network-level information, e.g., TAC ID, cell ID, UPF ID, UPF serving area, DNN of where the designated AF-UP is located, and/or
   b. This information may be application-level information, e.g., "Netflix cache", "Facebook transcoder", "YouTube stream synchronizer"
2. The AF-CP may send a list of AF-UP instances to the SMF that can be used, e.g., in the form of the same information as above, and the SMF may make the selection of UPF(s) related to the most appropriate one.

In general, the AF-CP may select one or more AF-UPs based on the functions needed by the application, being for example caching, transcoding, etc. The function may also be highly application-specific, e.g., a 'Netflix' cache. The AF- CP may be aware of the AF-UPs and thereby the available functions, or may in some embodiments be configured to establish a new AF-UP to perform a desired function. In selecting one or more of the AF-UPs, geographical information may be used, which may be represented by network-level information. The AF-CP may provide data to the SMF which may be indicative of the selected AF-UPs, such as exit ports of UPFs, locations, IDs that make it clear for the SMF how to route to the AF-UPs, etc. For example, the AF-CP may signal data such as 'interface XYZ on UPF at location ABC/with identifier FEG' to the SMF. The SMF may combine this data from the AF-CP with other information it has on the overall network architecture to select the UPF chain.

In either case, the access (or entry) UPF, referring to the first UPF that the traffic from the UE to the AF-UP instance or CDN traverses, may be selected by the SMF using network information (e.g., user location), which may be a 3GPP standard procedure. However, unlike the standard procedure, the anchor (or exit) UPF, referring to the last UPF traversed by the traffic from the UE to the AF-UP instance or CDN, may either selected by the AF-CP (option 1 above) or selected by the SMF (option 2 above in combination with standard procedure) based on information from the AF-CP.

Figure 8:
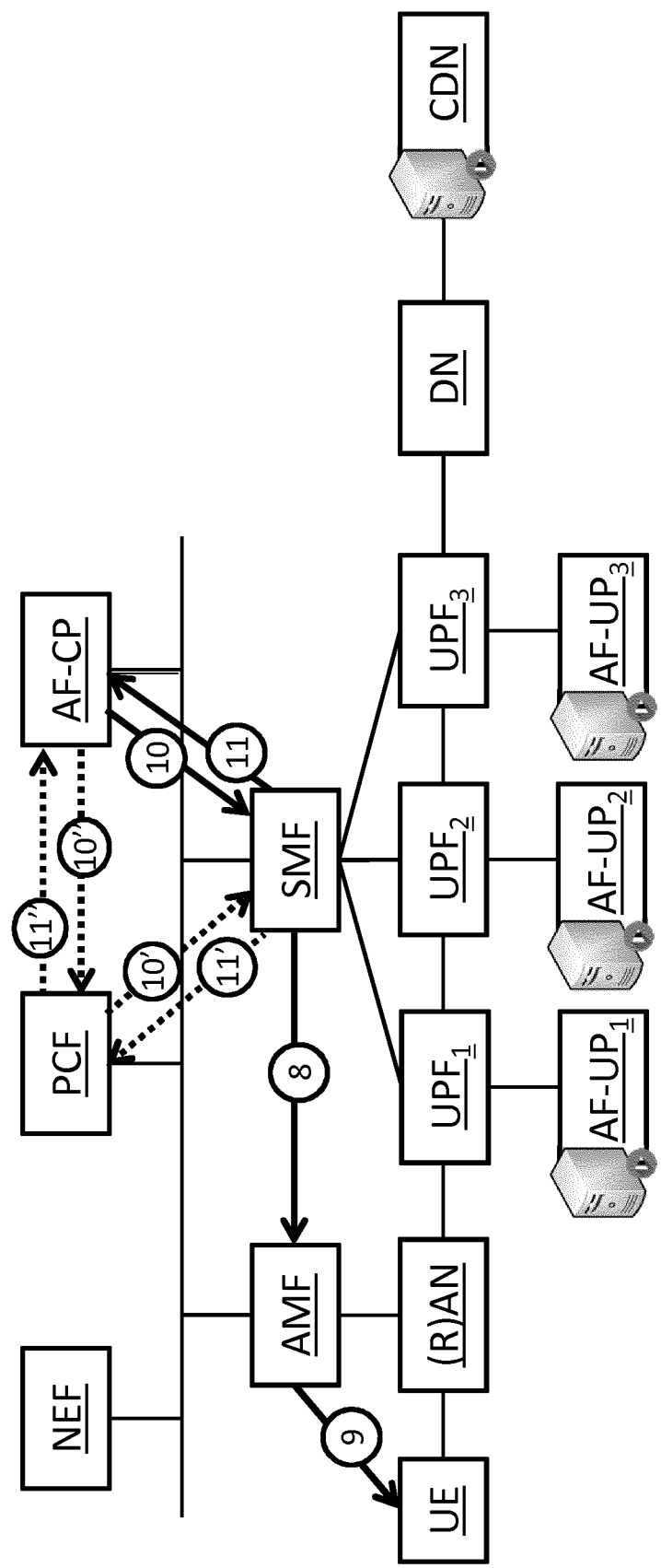
FIG. 8 illustrates a further message exchange in the establishment of the PDU session, involving the PCF, AMF and UE being notified of PDU session details.

FIG. 8 illustrates a further a message exchange in the establishment of the PDU session, involving the PCF, AMF and UE being notified of PDU session details. Namely, after the AF-CP has provided information to the SMF, it may subscribe to the SMF in order to be notified of the IP address that the SMF may assign to the UE following the selection of the chain of UPFs. This subscription may be issued by the AF-CP directly to the SMF, see solid line (10), or via the PCF, see dotted lines (10'), (10"), or via the NEF (not shown in this Figure). Once the SMF has selected the chain of UPFs for the PDU session of the particular UE in question, the SMF may notify the AF-CP of the IP address assigned to the UE. This notification may be directly sent by the SMF to the AF-CP, see solid line (11), or via the PCF, see dotted lines (11'), (11"), or via the NEF (not shown in this Figure). Furthermore, the SMF may inform the AMF that the PDU session establishment is accepted via a message (8) to the AMF. The AMF in turn may inform the UE via a message (9).

PDU Session

Figure 9:
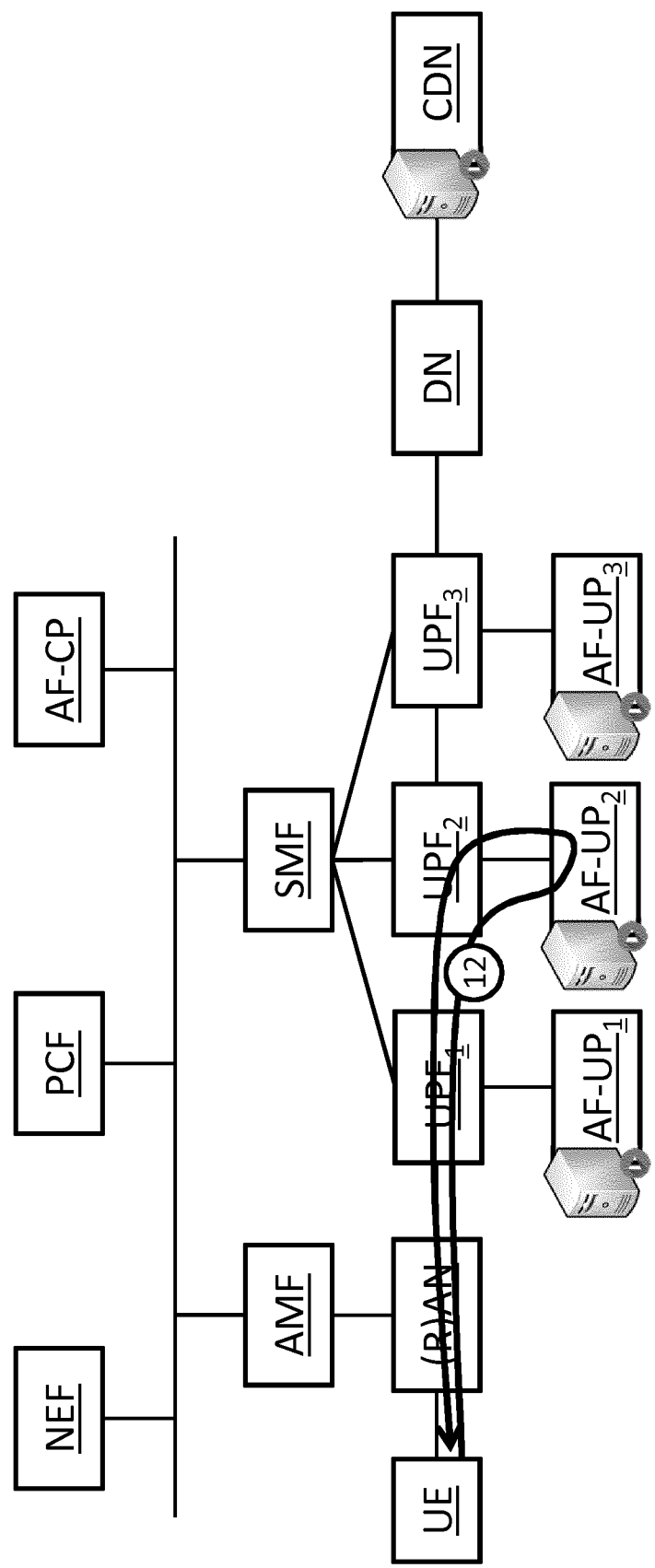
FIG. 9 illustrates a traffic flow during the established PDU session.

FIG. 9 illustrates a traffic flow via the established PDU session. Once the UE has received confirmation that the PDU session is established, the UE may start sending data over the network. In the example of FIG. 9, the AF-UP handling the traffic from the UE may be an 'edge cache' caching a video stream, and the network, based on the mechanisms introduced in the previous section, may have selected the AF-UP$_2$ instance and thereby UPF$_2$. The UE may thus use the PDU session to connect to AF-UP$_2$, request the video stream and then receive it from AF-UP$_2$, see (12) in FIG. 9.

UE Location Change

Figure 10:
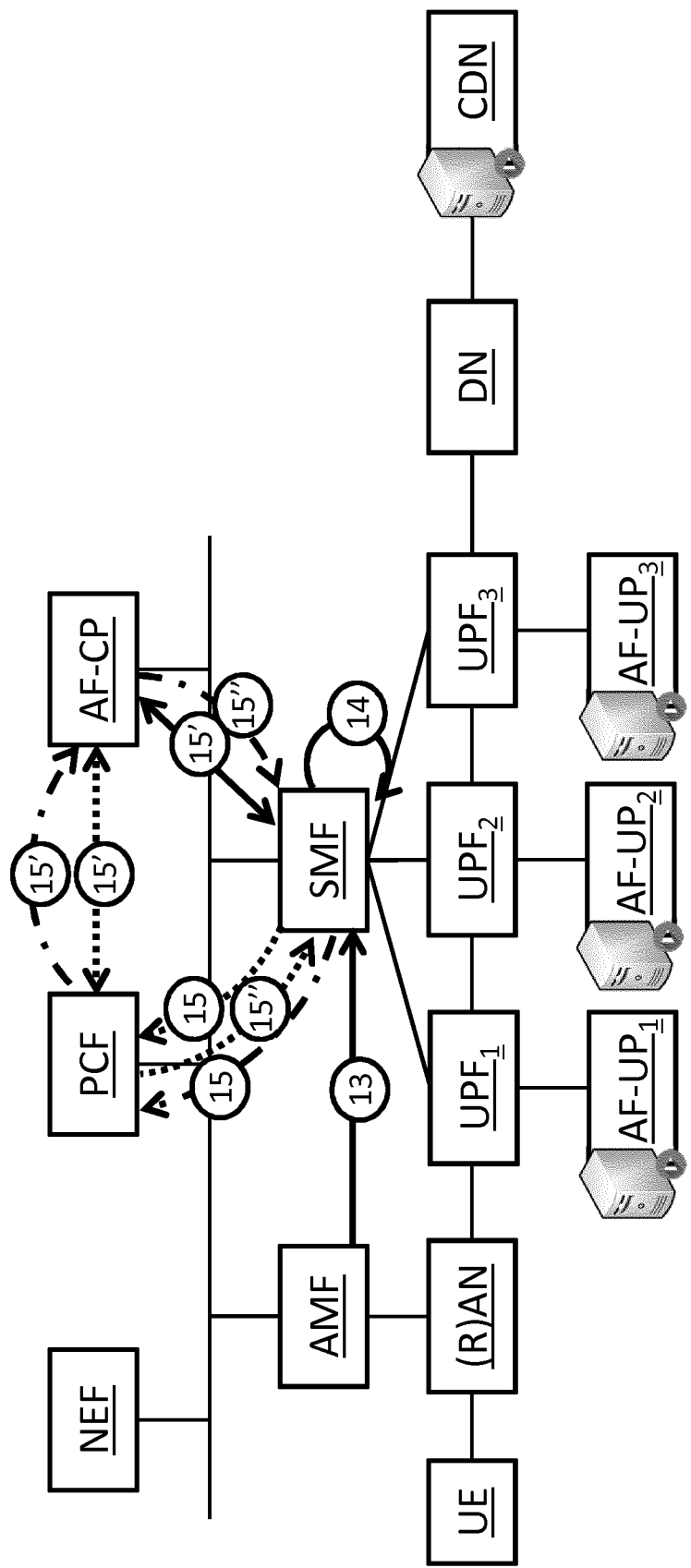
FIG. 10 illustrates a message exchange following a UE location change.

FIG. 10 illustrates a message exchange following a UE location change. Namely, as the UE moves, it may fall outside of the serving area of the access UPF that it is currently using. The new UE location may be communicated (13) by the AMF to the SMF and AF-CP. The latter type of communication, although not shown in FIG. 10, may involve the SMF triggering the AF-CP, e.g., based on a previous policy input from the PCF or AF-CP, or the AF-CP receiving a notification from the AMF upon UE mobility and issuing a request to the SMF to change the anchor UP. This in turn may result in the SMF changing the anchor UPF (14).

The SMF may then request the AF-CP again for AF-UP information, either directly, see solid line (15'), or indirectly via the PCF, see dash-dotted lines (15), (15'), (15") in which the request is sent via the PCF but the AF-CP responds directly to the SMF or dotted lines (15), (15'), (15") in which the AF-CP responds via the PCF, or via the NEF (not shown in the figure).

This may essentially be a repetition of parts of the steps/messages as shown in FIG. 7 in the PDU session establishment, with a difference being that requesting policy information from the PCF again may not be needed. The outcome of this step may be a new chain of UPFs for the UE's PDU session, in which the access UPF has changed and possibly the anchor UPF too, e.g., to a nearer UPF (e.g. UPF$_3$). Once the new anchor UPF has been established, the AF-CP may be notified of the new IP address allocated to the UE, if the IP address indeed has changed.

Changes in AF-UPs

After a PDU session has been established, it may occur that new AF-UP instances are deployed in the network, or that current instances are withheld (e.g., switched off or become unavailable). When this happens, the AF-CP may be informed using a known mechanism and may trigger the SMF to re-determine the UPF chain, as described in the previous section, for at least all UEs being served by a AF-UP that has been withheld, and/or for at least all UEs that may be affected by a new AF-UP instance being introduced, e.g., UEs in the proximity of the new AF-UP instance.

PDU Session Termination

It is noted that the partitioning of the AF function does not affect PDU session termination mechanisms. The AF-CP may be notified that the UE has terminated the PDU session, e.g., via a subscription with the AMF.

Figure 11:
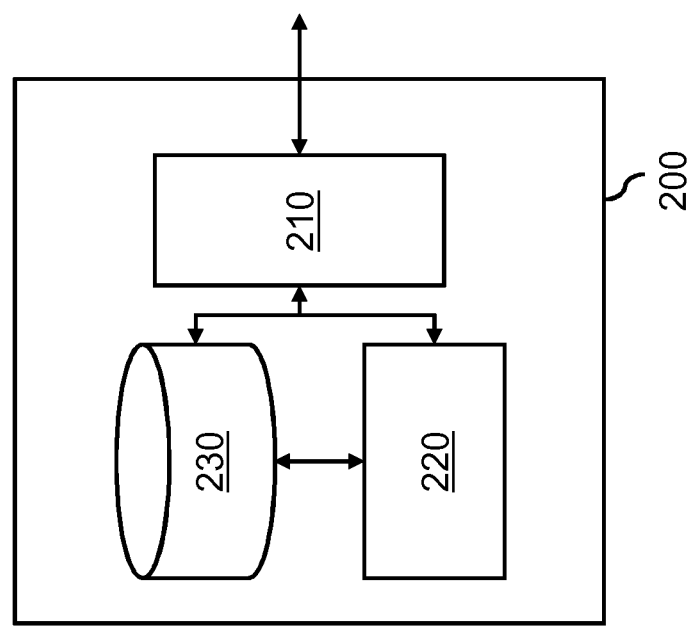
FIG. 11 shows a network node implementing an AF-CP.

FIG. 11 shows a more detailed view of the AF-CP 200, being in this example embodied by a single network node. It can be seen that the AF-CP 200 may comprise a network interface 210 for communicating with other network nodes in the network. The network interface 210 may take any suitable form, including but not limited to a wired network interface based on Ethernet or optical fiber or a wireless network interface. FIG. 11 further shows the AF-CP 200 comprising a storage 230, such as a hard disk, a solid state drive, or an array thereof, which may comprise identification information identifying one or more AF-UPs provided in the network.

The AF-CP 200 may further comprise a processor 220 which may be configured, e.g., by hardware design or software, to perform the operations described with reference to FIG. 2-10 in as far as pertaining to the AF-CP. For example, the processor 220 may be embodied by a single Central Processing Unit (CPU), but also by a combination or system of such CPUs and/or other types of processing units.

In general, the AF-CP 200 may be embodied by a (single) device or apparatus. For example, the AF-CP 200 may be embodied by a single network node, e.g., a network server. The AF-CP 200 may also be embodied by a distributed system of such devices or apparatuses. An example of the latter may be the functionality of the AF-CP 200 being distributed over different network nodes of a network.

Figure 12:
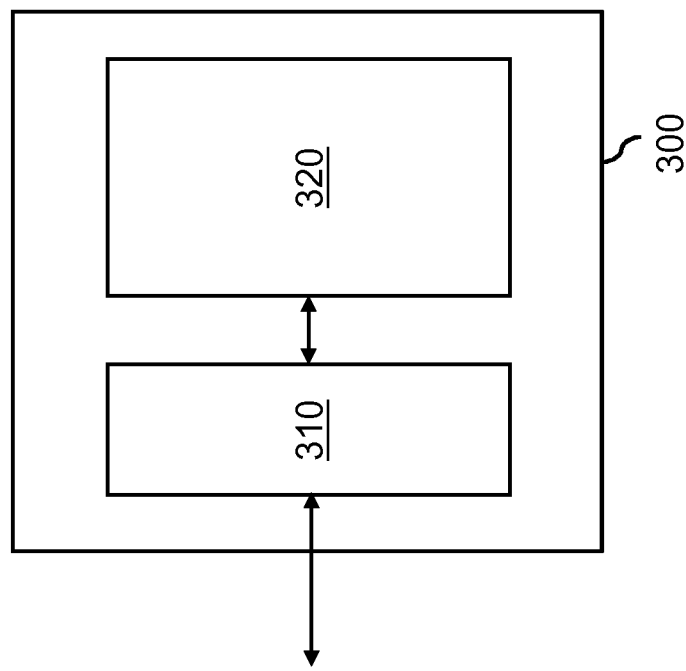
FIG. 12 shows a network node implementing an AF-UP.

FIG. 12 shows a more detailed view of the AF-UP 300, being in this example embodied by a single network node. It can be seen that the AF-UP 300 may comprise a network interface 310 for receiving and sending data such as (processed) user data. The network interface 310 may take any suitable form, including but not limited to those described with reference to the network interface 210 of the AF-CP 200 of FIG. 11.

The AF-UP 300 may further comprise a processor 320 which may be configured, e.g., by hardware design or software, to perform the operations described with reference to FIG. 2-10 and others in as far as pertaining to the AF-UP. For example, the processor 320 may be embodied by a single Central Processing Unit (CPU), but also by a system of such CPUs and/or other types of processing units. Although not shown in FIG. 12, the AF-UP 300 may further comprise a storage, e.g., for use in caching of storage functions. The storage may be of a same or similar type as the storage of the AF-CP 200 as previously described with reference to FIG. 12.

In general, the AF-UP 300 may be embodied by a (single) device or apparatus. For example, the AF-UP 300 may be embodied by a single network node, e.g., a network server. The AF-UP 300 may also be embodied by a distributed system of such devices or apparatuses. An example of the latter may be the functionality of the AF-UP 300 being distributed over different network nodes of a network. The AF-UP 300 may be a streaming server, transcoder, storage server, stream synchronizer, etc.

Although described with reference to the AF-UP, the network node 300 shown in FIG. 12 may also, in terms of architecture, represent a SMF. In this case, the network interface 310 may be configured to receive data from the AF-CP which is indicative of one or more AF-UPs, or indicative of the network path which is to be established, and the processor 320 may be configured to, via the network interface 310, select and optionally configure the one or the linked series of UPFs to be used in the data communication session involving the UE, wherein said selection is based on the data received from the AF-CP. The SMF may comprise a storage, e.g., for maintaining state information on the network and network sessions. The storage may be of a same or similar type as the storage of the AF-CP 200 as previously described with reference to FIG. 12. The SMF may be embodied by a single network node but also by a distributed system of network nodes, as also described above for the AF-UP.

In general, the AF-CP 200 of FIG. 11 and the AF-UP 300 of FIG. 12 or the SMF may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner, e.g., involving different devices.

Figure 13:
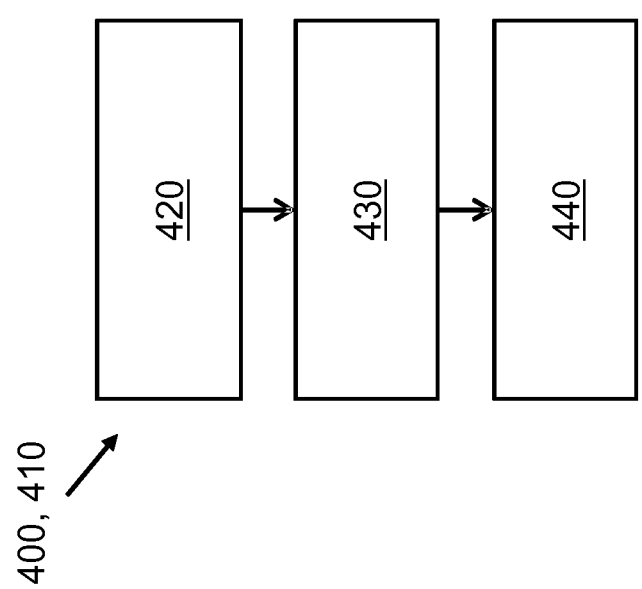
FIG. 13 shows a method of providing an application function.

FIG. 13 shows a method 400 of providing an application function. The method 400 may correspond to an operation of the network, or one or more network nodes thereof, described with reference to FIGS. 2-12. However, this is not a limitation, in that the method 400 may also be performed by another entity or distributed system of entities. The method 400 may comprise, in an operation 410 titled 'PROVIDING APPLICATION FUNCTION AS COMBINATION OF PARTS', providing, as one of the network functions, an application function which supports an application executed by the user equipment, the application function being provided as a combination of an application function control plane part operating in the control plane and an application function user plane part operating in the user plane and configured for application-specific processing of user data associated with the application, wherein the application function user plane part is a selected one of a plurality of application function user plane parts being accessible via one or more user plane functions.

The providing 410 the application function may comprise, in an operation titled 'CONFIGURING APPLICATION FUNCTION CONTROL PLANE PART', configuring 410 the application function control plane part with identification information identifying the plurality of application function user plane parts. The providing 410 the application function may further comprise, in an operation titled 'SELECTING APPLICATION FUNCTION USER PLANE PART', selecting 420 the application function user plane part from the plurality of application function user plane parts. The providing 410 may further comprise, in an operation titled 'SELECTING USER PLANE FUNCTIONS', establishing communication between the application function control plane part and the session management function to enable said function to select 430 the one or the linked series of user plane functions so as to establish a network path from the user equipment to said selected application function user plane part.

It will be appreciated that the above operations may be performed in any suitable order, e.g., consecutively, simultaneously, or a combination thereof, subject to, where applicable, a particular order being necessitated, e.g., by input/output relations.

Figure 14:
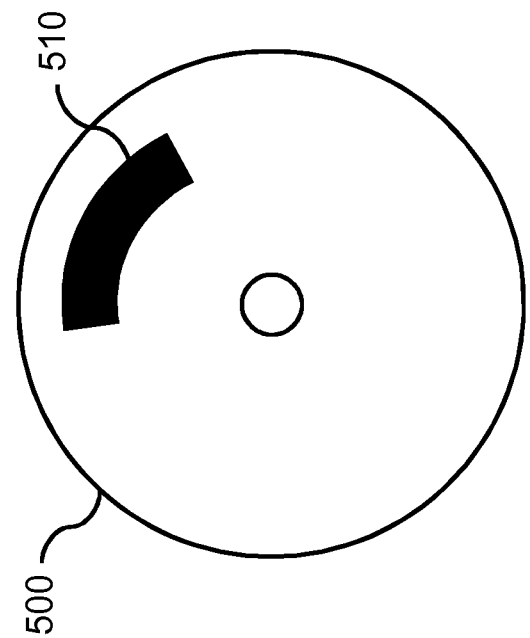
FIG. 14 shows a computer readable medium comprising non-transitory data comprising instructions for causing a processor system to perform the method.

The method 400 may be implemented on a processor system, e.g., on a computer as a computer implemented method, as dedicated hardware, or as a combination of both. FIG. 14 shows a computer-readable medium 500. For example, instructions for the processor system, e.g., executable code, may be stored on the computer readable medium 500, e.g., in the form of a series 510 of machine readable physical marks and/or as a series of elements having different electrical, e.g., magnetic, or optical properties or values. The executable code may be stored as transitory or non-transitory data. Examples of computer readable mediums include memory devices, optical storage devices, integrated circuits, online software, etc.

Figure 15:
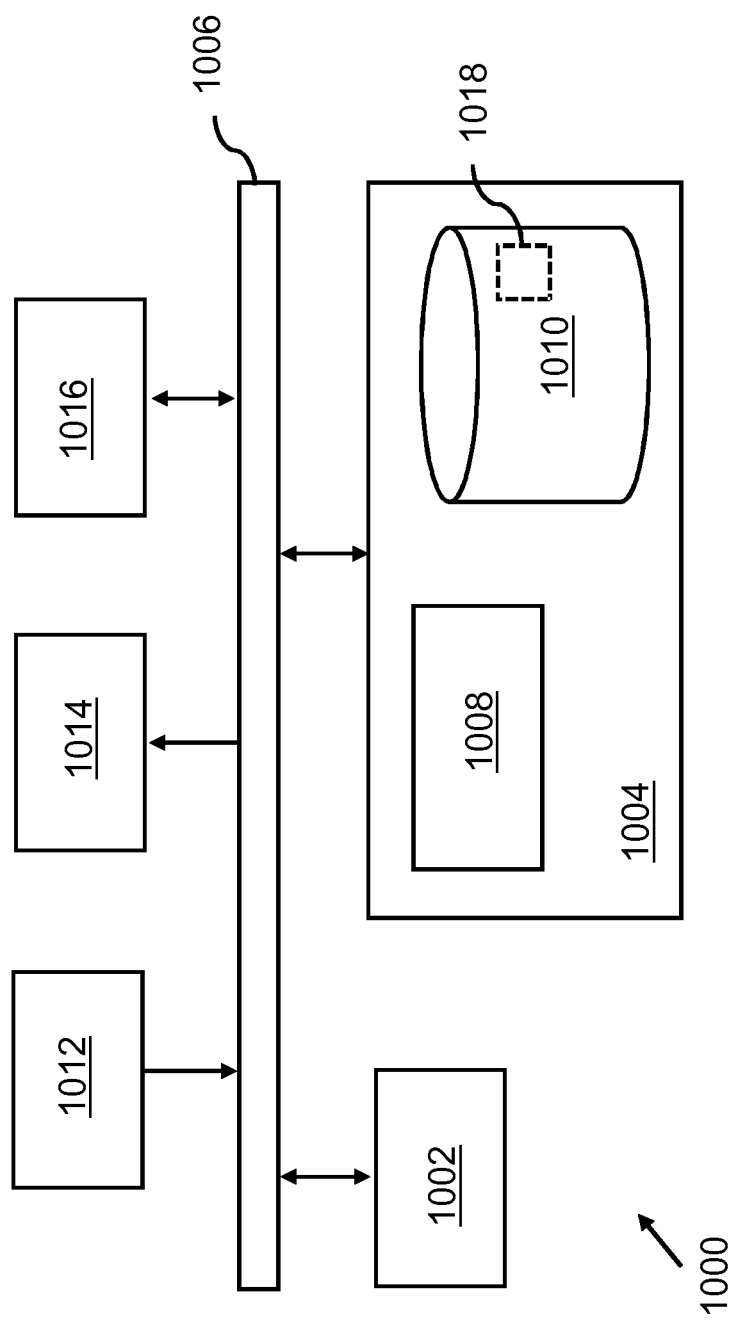
FIG. 15 shows an exemplary data processing system.

FIG. 15 is a block diagram illustrating an exemplary data processing system that may be used in the embodiments described in this specification. Such data processing systems include data processing entities described in this specification, including but not limited to the AF-CP, the AF-UP and the SMF.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 15, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may represent the AF-CP. In that case, application 1018 may represent an application that, when executed, configures data processing system 1000 to perform the functions described herein with reference to the AF-CP. In another aspect, data processing system 1000 may represent the AF-UP. In that case, application 1018 may represent an application that, when executed, configures data processing system 1000 to perform the functions described herein with reference to the AF-UP. In another aspect, data processing system 1000 may represent the SMF. In that case, application 1018 may represent an application that, when executed, configures data processing system 1000 to perform the functions described herein with reference to the SMF.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A communication network comprising a plurality of network nodes, the network configured to provide:
　a control plane to enable transmission of control data in the network;
　a user plane to enable transmission of user data to and/or from user equipment which is connected to the network; and
　a set of network functions which comprise user plane functions operating in the user plane and control plane functions operating in the control plane,
　wherein the control plane functions include a session management function configured to select one or a linked series of user plane functions to be used in a data communication session involving the user equipment;
　wherein the network is configured to provide, as one of the network functions, an application function which supports an application executed by the user equipment, the application function being provided as a combination of an application function control plane part operating in the control plane and an application function user plane part operating in the user plane and configured for application-specific processing of user data associated with the application, wherein:
　the application function user plane part is selected from a plurality of application function user plane parts, each of the plurality of application function user plane parts being accessible via one or more user plane functions; and
　the application function control plane part is configured with identification information identifying the plurality of application function user plane parts and to communicate with the session management function to enable said function to select the one or the linked series of user plane functions so as to establish a network path from the user equipment to said selected application function user plane part.

2. The communication network according to claim 1, wherein the application function control plane part is configured to:
　select the application function user plane part, and
　provide data indicative of the selected application function user plane part, or indicative of the network path which is to be established, to the session management function to enable said function to select the one or the linked series of user plane functions to the selected application function user plane part.

3. The communication network according to claim 1, wherein the application function part control plane is configured to:
　identify a subset of the plurality of application function user plane parts;
　provide data indicative of the subset of application function user plane parts, or indicative of the network path which is to be established to one or more of the subset, to the session management function;
　wherein the session management function is configured to select the one or the linked series of user plane functions based on said data.

4. The communication network according to claim 1, wherein the data provided to the session management function comprises network-level information, including but not limited to one or more of:
- an identifier indicative of an application function user plane part;
- a location of an application function user plane part;
- an identifier of the user equipment;
- an identifier or a serving area of one or more of the selected one or linked series of user plane functions; and
- a data network name of a data network which comprises an application function user plane part.

5. The communication network according to claim 1, wherein the data provided to the session management function comprises application-level information, including but not limited to one or more of:
- an identifier of the application; and
- an identifier of the application-specific processing to be performed by an application function user plane part.

6. The communication network according to claim 1, wherein the control plane functions of the network further include a policy function which performs policy control for quality of service in the network, and wherein the session management function is configured to select the one or the linked series of user plane functions further based on policy data provided by the policy function.

7. The communication network according to claim 6, wherein the application function user plane part is selected further based on the policy data.

8. The communication network according to claim 1, wherein the control plane functions of the network further include an access management function for authenticating and authorizing user equipment so as to enable the user equipment to register with the network, and wherein the application function control plane part is configured to subscribe to the access management function with a list of identifiers of user equipment so as to be notified when the user equipment identified on the list registers with the network.

9. The communication network according to claim 8, wherein the access management function is further configured to:
- manage mobility of the user equipment; and
- signal the application function control plane part when the user equipment changes location.

10. A network node or a distributed system of network nodes configured as the application function control plane part in the communication network according to claim 1, comprising:
- a data storage comprising the identification information identifying the plurality of application function user plane parts;
- a network interface to the network;
- a processor system configured to communicate via the network interface with the session management function to enable said function to select the one or the linked series of user plane functions so as to establish the network path from the user equipment to said selected application function user plane part.

11. A network node or a distributed system of network nodes configured as the application function user plane part in the communication network according to claim 1, comprising:
- a network interface to the network and configured to receive or send the user data associated with the application executed by the user equipment;
- a processor system configured to perform the application-specific processing of the user data.

12. The network node or the distributed system of network nodes according to claim 11, configured as at least one of:
- a streaming server;
- a transcoder;
- a storage server; and
- a stream synchronizer.

13. A network node or a distributed system of network nodes configured as the session management function in the communication network according to claim 1, comprising:
- a network interface to the network and configured to receive data from the application function control plane part which is indicative of the selected application function user plane part, or indicative of the network path which is to be established;
- a processor system configured to, via the network interface, select the one or the linked series of user plane functions to be used in the data communication session involving the user equipment, wherein said selection is based on the data received from the application function control plane part.

14. A method for providing an application function in a communication network, wherein the network comprises a plurality of network nodes and is configured to provide:
- a control plane to enable transmission of control data in the network;
- a user plane to enable transmission of user data to and/or from user equipment which is connected to the network; and
- a set of network functions which comprise user plane functions operating in the user plane and control plane functions operating in the control plane, wherein the control plane functions include a session management function configured to select one or a linked series of user plane functions to be used in a data communication session involving the user equipment;

the method comprising providing, as one of the network functions, an application function which supports an application executed by the user equipment, the application function being provided as a combination of an application function control plane part operating in the control plane and an application function user plane part operating in the user plane and configured for application-specific processing of user data associated with the application, wherein the application function user plane part is a selected one of a plurality of application function user plane parts being accessible via one or more user plane functions;

wherein said providing the application function comprises:
- configuring the application function control plane part with identification information identifying the plurality of application function user plane parts;
- selecting the application function user plane part from the plurality of application function user plane parts; and
- establishing communication between the application function control plane part and the session management function to enable said function to select the one or the linked series of user plane functions so as to establish a network path from the user equipment to said selected application function user plane part.

15. A non-transitory computer-readable medium comprising a computer program, the computer program comprising instructions for causing a processor system to perform the method according to claim 14.

\* \* \* \* \*